Patented Sept. 3, 1940

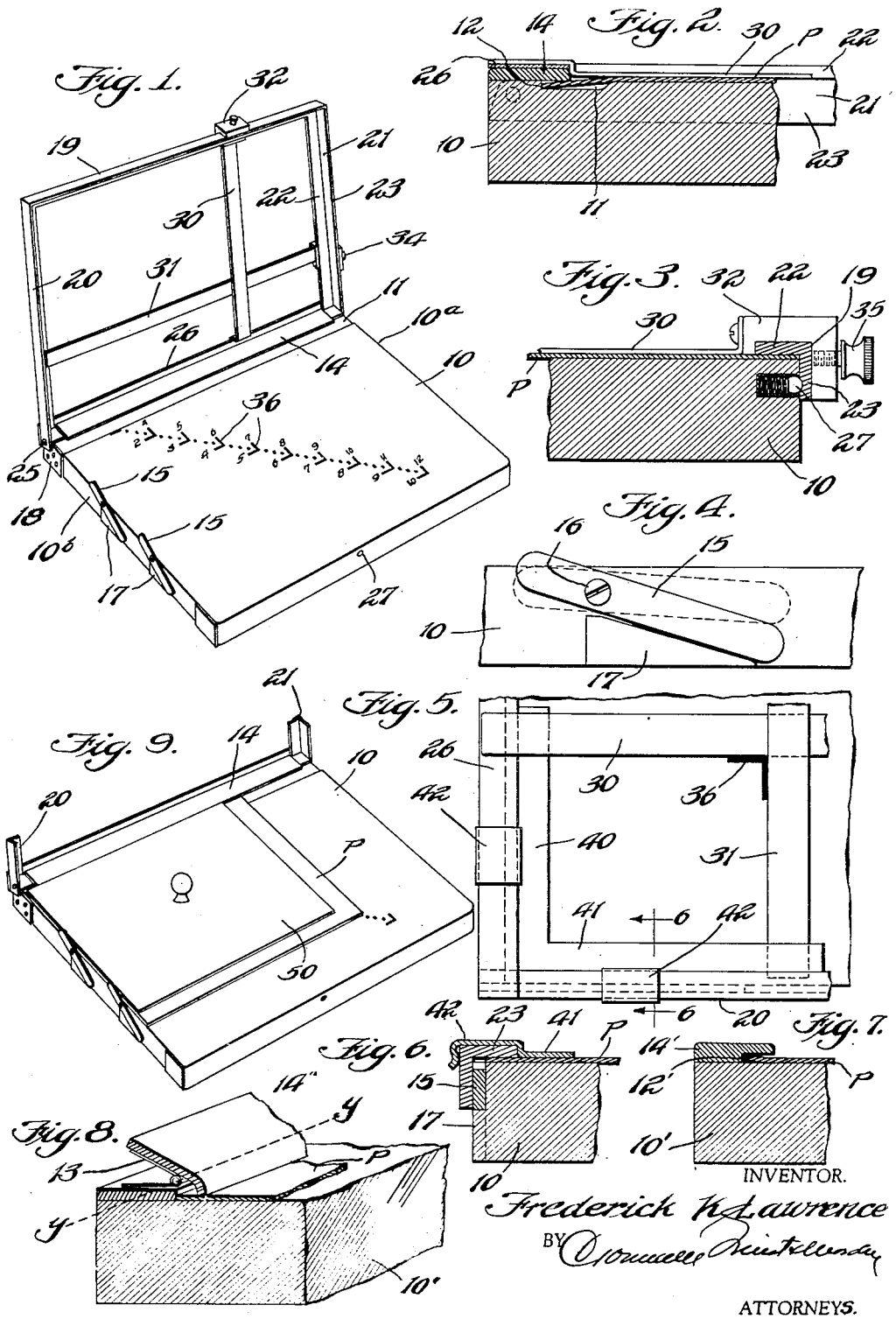

2,213,652

UNITED STATES PATENT OFFICE 2,213,652

PHOTOGRAPHIC ENLARGING EASEL OR PRINTING FRAME

Frederick K. Lawrence, Chicago, Ill., assignor to Mildred J. Lawrence, Chicago, Ill.

Application July 2, 1938, Serial No. 217,166

9 Claims. (Cl. 88—24)

This invention relates to apparatus of the type commonly known as photographic enlarging easels, which may be described generally as appliances for holding sensitized paper in proper condition and position for exposure under the lens of photographic enlargement printers. The present device also may be used for contact printing from photographic films, for printing of borders, etc.

A general object of the invention is the provision of such a device which is of simple construction and very easy to operate, and also thoroughly reliable to maintain the sensitized paper in proper position, all of which factors are of particular importance in the use of apparatus of this character in view of the fact that it must of necessity be operated under conditions of very restricted visibility in a darkroom.

Another object is the provision of such an apparatus which is easily and quickly adaptable for the making of prints of different sizes and proportions.

Another object is the provision of such an apparatus which is adapted for the preparation of prints with uniform borders, either white (unexposed) or black (exposed) borders, and the accurate squaring of the border and the image on the sheet.

A special object of the invention is the provision of such an apparatus which facilitates the handling of the sensitized paper, in the operations of mounting it in the easel for exposure, and which also facilitates the very accurate positioning of the paper and is effective to retain it securely in place incident to the shifting of the easel relative to the negative as well as during the exposure.

Other and further objects of the invention will be pointed out or indicated hereinafter, or will be apparent to one skilled in the art upon an understanding of the invention or its employment in practice.

For purpose of aiding in an explanation of the invention, I show in the accompanying drawing forming a part of this specification, and hereinafter describe, certain forms in which it may be embodied. It is to be understood, however, that these are presented merely for purpose of illustration, and hence that the showing and explanation thereof are not to be construed in any fashion calculated to limit the appended claims short of the true and most comprehensive scope of the invention in the art.

In said drawing,

Fig. 1 represents a perspective view of an enlarging easel or printing frame embodying my invention, showing same in the "open" condition, i. e., with the swinging frame portion raised to permit insertion or positioning of the sensitized paper;

Fig. 2 is a detail representing a vertical section through the marginal portion of the device at the hinge side when the swinging frame is in the lowered position and a sheet of paper is upon the platen member;

Fig. 3 is a detail in the nature of a section through the marginal portion of the device opposite that shown in Fig. 2;

Fig. 4 is a detail in the nature of an elevational view of a portion of one end of the platen, showing one of the margin guide elements;

Fig. 5 is a detail in the nature of a part top view of one corner of the device with the swinging frame in the lowered position and with an auxiliary marginal mask;

Fig. 6 is a detail in the nature of a section at 6—6 of Fig. 5, but on a larger scale;

Fig. 7 is a detail corresponding to Fig. 2, but showing a slightly modified construction;

Fig. 8 is a perspective view, in section, serving to illustrate a second modified construction; and Fig. 9 is a perspective view illustrating use of the device for dark margin printing.

Referring to the illustrative embodiment shown in Figs. 1 to 4 inclusive, let it be understood that the reference numeral 10 designates the platen, or baseboard of the device, which constitutes both a foundation or support for the other parts and a backing or support for the sensitized paper when it is positioned for exposure. The platen may be of various shapes, but preferably is of rectangular form, as here shown, and is of an area corresponding approximately to that of a sheet of photographic paper of the largest standard size that the device is designed to handle, for example, 11 x 14 inches.

The upper surface of the platen is plane, and adjacent one margin is rabbeted, as at 11, so as to form a shallow channel, which is bounded at its outer side by an upstanding shoulder portion 12 to function as a margin guide extending at right angles to the adjacent margins 10a and 10b of the platen member. Fixed to the platen member and overhanging the channel 11 is a ledge member 14 which projects only part way across the width of the said channel and projects inwardly beyond the margin guide 12 a distance corresponding to the desired normal margin width of a contemplated photographic print, for example ¼ inch.

The association of the ledge member 14 with the channel 11 affords a crevice between the bottom of the channel and the under surface of the overhanging portion of the ledge member, which crevice is of an appropriate depth to receive the marginal portion of a sheet of photographic sensitized paper, said crevice being appreciably deeper than the thickness of the paper. Accordingly, the marginal portion of the paper may be inserted into said crevice and its edge abutted against the margin guide 12.

The platen is provided with the cooperating margin guide along the adjacent margin 10b, said margin guide being made up of the margin guide elements 15, which may be of any appropriate number, two or more. These are short pieces of stiff material, such as metal, and they are pivotally mounted on pintle screws 16 (see Fig. 4) so that they may swing in vertical arcs. Stop members 17, formed on or fixed to the platen member, are arranged for cooperation with the elements 15 to limit their swinging movements to a positon where their noses project above the upper surface of the platen member 10, as shown in full lines in Fig. 4, and the distribution of their weight relative to the pivot point is such that they tend to assume that position by gravity. However, by application of pressure to their upwardly projecting nose portions, they may be swung to a lowered position such as illustrated in dotted lines in Fig. 4. The disposal of the elements 15 is such that a straight line tangent to the inner surfaces of their nose portions extends at right angles to the margin guide 12. At the end of the channel 11, a small plate 18 is affixed to the margin of the platen member, the upper margin of said plate being flush with the general surface plane of the platen member, and the inner face of the plate at the end of the channel 11 being in alignment with the inner surfaces of the nose portions of the elements 15. Thus the plate 18 also forms a stop or a portion of the composite margin guide which includes also the elements 15.

Hinged to the platen member adjacent the margin guide 12 is a swinging frame, which is formed of a stiff angle member bent to form three rails 19, 20 and 21, disposed in rectangular relationship to each other and to the margin guide 12. Because of the form of the angle member, each of the rails has a top flange 22 and a depending flange 23, and the frame is so proportioned that the depending flanges will fit against the three corresponding edges of platen member 10, and the top flanges 22 will rest upon marginal portions of the top surface of the platen member. The swinging frame is hinged on the platen member by means of pintle screws 25, and may be swung to a raised or open position, as illustrated in Fig. 1, or down to a lowered or closed position wherein the top flanges 22 rest on the upper surface of the platen member as described above.

When the frame is in the raised position, as shown in Fig. 1, the nose portions of the margin guide elements 15 are automatically swung to the elevated position shown in Fig. 4 by force of gravity. When the frame is swung down to the lowered position, the top flange of the rail 20 engages the elements 15, one after another, in their order from the hinged margin of the platen, and swings them down to the dotted line position shown in Fig. 4. A connecting strip 26 connects the rail members 20 and 21 adjacent their hinged ends, in position that it will swing down on top of the ledge member 14 when the frame is lowered. A spring-pressed detent 27 is mounted in the platen member in position for cooperation with the depending flange of the rail 19, to retain the frame in the desired "closed" association with the platen member. The extent to which the top flanges 22 of the rail members overlap the upper surface of the platen member corresponds to the normal width of margin desired for the photographic print, corresponding in this particular to the overhang of the ledge member 14, for example, one-fourth of an inch.

From the foregoing it will be understood that the device so far described constitutes a frame or easel for the mounting of a sheet of sensitized photographic paper for exposure under an enlargement printer or the like, and that it affords means for accurately positioning or "squaring" the sheet of paper and for retaining it securely in the desired position and for masking borders of uniform width on a sheet of the maximum size for which the device is designed. The sheet is mounted in the device by inserting its marginal portion under the overhanging ledge 14 and abutting its margin against the margin guide 12, and its adjacent margin against the upwardly projecting portions of the elements 18 and 15 which, as stated above, are tangent to a line which extends at right angles from the margin guide 12. Hence the sheet is accurately positioned or squared. Sensitized photographic paper ordinarily has a certain amount of set, or tendency to curl, due to the presence of the emulsion on one side. This feature makes it difficult to handle and position accurately under most circumstances. However, by means of the device above described, the accurate positioning of the sheet, and also its retention in a flat condition for printing, is rendered very simple. Due to the curling tendency of the paper, as well as the downward offset of its marginal portion in the channel 11, as seen in Fig. 2, the ledge member 14 exercises a clasping or retaining action on the sheet, so that it is not readily moved incident to the swinging down of the frame into overlying engagement with its marginal portions. As the frame is swung down, moreover, the plate 18 and one or more elements 15 continue to function as guide elements which cooperate with the margin guide 12 to hold the sheet against lateral displacement, and when the frame is swung completely down, the engagement of the upper flanges 22 upon the marginal portions of the sheet holds the sheet securely and in a flat outspread condition, and the depending flanges 23 shield the edges of the paper against ingress of light along the surface. As a consequence, the device may be moved with entire freedom to position it under the printer and properly spot the image upon it.

In order to accommodate the device to the making of prints of less than the maximum capacity size, I provide the supplemental rail members 30 and 31. These are in the nature of thin metal strips each of which is fixedly mounted at one end in a clamping block, designated respectively 32 and 34. These blocks are formed to embrace the rail members 19 and 21 respectively, and each is provided with a set screw 35 which may be set up to clamp the block, and hence the attached strip, in selected position on the associated rail. These blocks are slidable longitudinally on the rails and accordingly the supplemental rail 30 may be positioned at a selected distance from the frame rail 20 and the supplemental rail 21 at a desired distance from the margin guide 12.

When so positioned, the supplemental rail members 30 and 31 are adapted to function in the same fashion as the upper flange portion 22 of the rail members 19 and 21, viz., to cover the marginal portions of a sheet of paper which is less than the maximum size, and to cooperate with the ledge member 14 and upper flange of rail member 20 in holding them in their outspread position on the platen. In the insertion of such smaller sized sheets, the margin guides 12 and 18—15 are availed of to position the sheet accurately, as above described.

To facilitate the accurate positioning of the supplemental rail members 30 and 31, I provide on the upper surface of the platen member a scale made up of boldly marked corner elements 36, which are disposed in a generally oblique relationship, as shown in Fig. 1. Numerals may be associated with these to indicate their spacings relative to the margin guides 12 and 15. It is of distinct advantage to have these scale markings disposed on the surface of the platen member, as thereby they are positioned immediately under the eye of the operator, and the adjustment of the supplemental rail members to the desired position is greatly facilitated. Since these devices are customarily used in a darkroom, under a red light, and the visibility is consequently more or less limited, it is desirable that these markings be quite bold and prominent and of color contrasting with that of the general surface of the platen member. However, in the printing of very thin paper, it might occur that differences in degree of reflection from the markings and the upper surface portion of the platen might affect the sensitized paper to different degrees, and hence show in the developed print. Accordingly, I find it desirable to make both the upper surface of the platen and also the scale markings of colors which will not be effective to reflect the rays of the printing light to which the sensitized paper is responsive. For example, the surface of the platen may be colored black and the scale markings may be orange, or vice versa, such coloration affording the necessary contrast, but at the same time avoiding the reflection of the photo-effective rays. The manner in which the supplemental rail members 30 and 31 are associated with a scale mark 36 is illustrated in Fig. 5.

In Fig. 5 is illustrated also an auxiliary margin mask, which may be used in conjunction with the supplemental rail members 30 and 31 when a white or unexposed margin of additional width is desired. Ordinarily, such wide margins, 3/4 inch for example, are not used excepting on smaller sized prints.

The auxiliary margin mask is in the form of a thin plate having legs 40 and 41 extending at right angles to each other and clips 42 affixed to said legs. One of these clips is adapted to engage the upper flange of the rail member 20, as illustrated in Fig. 6, and the other one is adapted to engage the connecting strip 26, thus to mount the auxiliary margin mask on the swinging frame in the corner adjacent the two margin guides. The width of the leg members 40 and 41 is such that it adds the necessary increment to the normal margin width to produce a masked margin of the desired width. The supplemental rails 30 and 31, of course, are of the necessary width to mask the other two margins of the sheet to a similar width.

Figs. 7 and 8 show two modified arrangements of the ledge member. In Fig. 7 the platen is designated 10', and it will be observed that it is not channeled like the form shown in Fig. 2. Instead, the ledge member 14' is secured to the platen member in such fashion that it overhangs a portion of the upper surface thereof to provide the sheet-receiving crevice, and the margin guide 12' is formed on the ledge member 14'.

In the modification shown in Fig. 8 the ledge member is in the form of a rocking strip 14", which is hinged so as to rock on an axis y—y and is pressed by a spring 13 in such fashion as to urge its nose portion downwardly into clasping or clamping engagement with the sheet of paper P on the platen 10". As in the form first above described, the modified ledge members of Figs. 7 and 8 both mask marginal portions of the sheet so as to produce margins of the desired uniform width.

The device may be used for the printing of black margins, in the manner illustrated in Fig. 9. The sheet of sensitized paper P is positioned on the platen member as above described, and is retentively engaged in the crevice under the ledge member 14 and is squared by abutting its adjacent margins against the margin guides 12 and 18—15. The swinging frame, however, is left in its raised position, and an opaque plate 50 is employed to hold the sheet in flat outspread position and to mask its central portion. Of course, the area of the plate which is to be used will depend upon the dimensions of the print desired, but in any event, in order to obtain the black margin, the plate will be of smaller size than the sheet. With the sheet positioned in marginal engagement with the margin guides, the plate, of the desired size, is placed upon it and is squared in relation to the sheet by abutting it against the ledge member 14 and the margin guide elements 15. This leaves marginal portions of the sheet exposed beyond two edges of the plate. These exposed edges are subjected to the printing light. Then the sheet is reversed so that the margins which previously were exposed are now in contact with the margin guides, the plate is re-applied as in the first instance, and the newly exposed marginal portions are subjected to the printing light. In this fashion a printed border of uniform width is provided around the sheet, the central portion of the sheet being as yet unexposed, and when the sheet is finally developed, after exposure of the central portion under the negative, the margin will have the exposed color characteristic of the photographic paper, viz., black for a bromide print, brown for a sepia, etc.

The device also may be used for the making of contact prints from photographic films. As stated above, the height of the crevice under the ledge member 14 is materially greater than the thickness of the sheet of photographic paper, and may accommodate also the marginal portion of the photographic film on top of the sheet of paper. Such film, as well as the paper, will be squared in position by abutment of its margins with the margin guide members, and the film together with the paper will be held in flat outspread position by the rail members of the frame when the latter is in the lowered position.

It will be apparent that in the use of the device in any of the foregoing fashions, the insertion and accurate positioning of the photographic sheets are greatly facilitated, and the removal of the printed sheet may be effected easily after raising of the swinging frame to the upstanding position. It will be apparent also that the sheet under the frame is definitely held in flat outspread position so that the device with the sheet mounted in it may be moved with assurance and safety so as to properly adjust it with respect to the film holder or the enlarging lens. It is particularly adapted to be manipulated and used with dependability under the restrictions of space and visibility ordinarily encountered in a photographic dark-room, and has the requisite flexibility for accommodation to the wide variety of sizes ordinarily made in enlargement printing.

What I claim is:

1. A photographic printing device comprising a platen member affording a plane surface and a ledge member affixed to the platen member and having an overhanging part spaced above a portion of the latter sufficiently to afford a shallow crevice adapted to permit insertion of the margin of a sheet of photographic paper between them and cooperate with the platen member to engage retentively the marginal portion of the inserted sheet and to hold it against curling upwardly, an upstanding guide below the overhanging part of the ledge member for engagement with the inserted edge of the paper, and a stop on the platen member in position to engage an adjacent edge of the paper, for the purpose of positioning it on the platen member.

2. A photographic printing device as specified in claim 1 and including also a swinging frame comprising three rails rigidly connected in rectangular relationship and hinged to the platen member adjacent the ends of the ledge member and in rectangular relationship to it, so that said frame may be swung to upstanding position and to a lowered position, said frame being of such dimensions that its rails overlie marginal areas of the platen member so that they, in conjunction with the overhanging part of the ledge member, may mask border areas of equal width along four marginal portions of a sheet of photographic paper supported on the platen member.

3. A device of the kind described comprising a platen member having a flat upper surface, a ledge member extending along the surface of the platen member, the platen member being rabbeted below an overhanging portion of the ledge member to provide a shallow crevice of depth to admit and retentively engage the marginal portion of a sheet of photographic paper, end rails extending parallel with each other at opposite ends of the platen member and each having hinged connection therewith so that said rails may be swung upwardly away from the platen member or downwardly into overlying relationship with its upper surface, and a side rail connected to the other ends of said end rails and extending in rectangular relationship thereto, whereby said rails form a swinging frame adapted for cooperation with said ledge member to overlie margins of a sheet of paper and hold the sheet outspread upon the platen member.

4. A device as specified in claim 3 and including upwardly projecting margin guides on the platen member in rectangular relationship to each other, one of said guides being below the overhanging portion of the ledge member.

5. In a device of the class described, in combination, a platen member having a plane upper surface, adjustable margin rails movable to selective positions overlying said surface and adapted to hold marginal portions of a sheet of paper against the same, said surface being provided with scale markings as guides for the positioning of said rail members, said upper surface and said scale markings being of colors which contrast distinctly with each other but which are of substantially the same value as to their ability to reflect light rays which are chemically effective on the emulsion of photographic paper.

6. A device of the sort described comprising, in combination, a platen member having a plane upper surface, margin guides extending at right angles to each other along adjacent marginal portions of the platen member, members connected in rectangular relationship to form a swinging frame hinged to the platen member so that it may swing upwardly away from its upper surface and downwardly into overlying relation thereto, and L-shaped margin mask having leg portions extending angularly relative to each other and clip portions affixed to it whereby it may be attached to said frame to occupy a position within an internal angle thereof with its legs extending alongside the adjacent frame members so that it may be swung therewith into overlying relation to upper surface portions of the platen adjacent said frame members.

7. In a photographic printing device, a platen member having a flat upper surface, a ledge member extending along one margin of the platen member and having an overhanging portion spaced from the top surface thereof to admit and retentively engage the marginal portion of a sheet of photographic paper and form a margin mask therefor, a swinging frame comprising three rails rigidly connected in rectangular relationship to one another and to the ledge member and hinged to the platen member so that it may be swung to upstanding position and to a lowered position upon the platen member, said rails having inwardly projecting flanges adapted to overlie marginal portions of the platen member and mask margins of a sheet of paper thereon, said rails having also depending flanges adapted to extend downwardly along edges of the platen member.

8. A photographic printing device comprising a platen member affording a plane surface and having a shallow groove formed therein, a ledge member thereon on said platen and having a part overhanging a portion of the groove sufficiently to afford a shallow crevice adapted to permit insertion of the margin of a sheet of photographic paper into the groove and under said overhanging part so that the ledge and platen members may cooperate to engage it retentively to restrain it against shifting, an upstanding guide below the overhanging part of the ledge member for engagement with the inserted edge of the paper, and a swinging member hinged on the platen member and movable to elevated and lowered positions relative to same, said swinging member carrying portions adapted to rest upon other portions of the sheet of paper to cooperate with the ledge member to hold it outspread on the platen.

9. A photographic printing device comprising a platen member affording a plane upper surface and having a shallow groove rabbeted therein, there being an upstanding shoulder portion at one side of the groove to form a margin guide for a sheet of paper, a ledge member retained on the platen with an overhanging part extending over a portion of the grooves so as to afford a shallow crevice adapted to permit insertion and retention of a margin of a sheet of photographic paper in said groove under said overhanging part, and means carried on the platen member and movable into overlying relationship with other portions of said sheet of paper to cooperate with the ledge member to hold it outspread on the platen.

FREDERICK K. LAWRENCE.

CERTIFICATE OF CORRECTION.

Patent No. 2,213,652. September 3, 1940.

FREDERICK K. LAWRENCE.

It is hereby certified that error appears in the printed specification of the above numbered patent requiring correction as follows: Page 4, second column, line 42, claim 8, strike out the word "thereon"; line 65, claim 9, for "grooves " read --groove--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.